G. E. SAVAGE.
APPARATUS FOR MAKING TEA AND OTHER INFUSIONS.
APPLICATION FILED JUNE 28, 1912.
1,077,491.                               Patented Nov. 4, 1913.
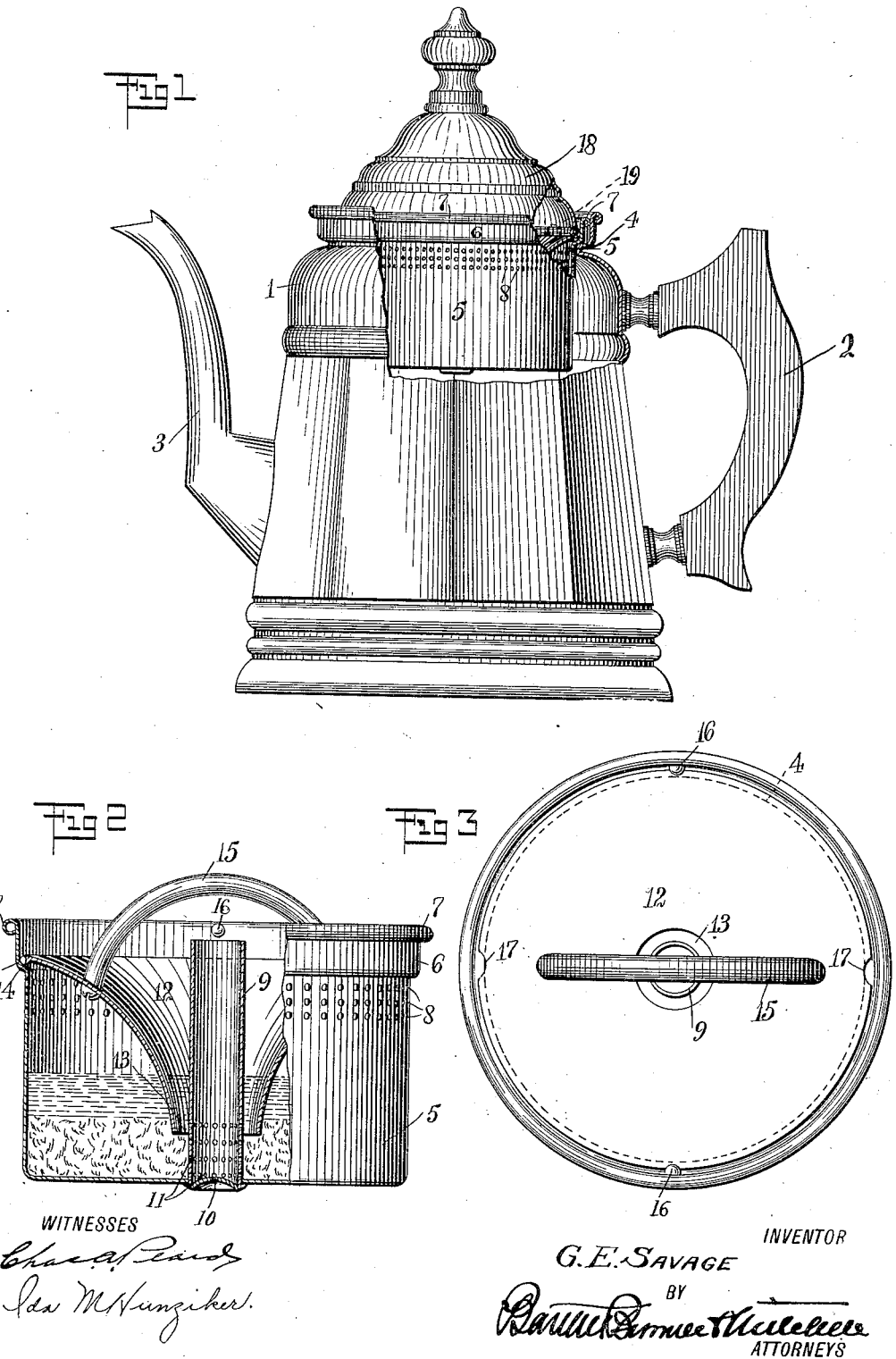
WITNESSES
INVENTOR
G. E. SAVAGE
BY
ATTORNEYS

UNITED STATES PATENT OFFICE.

GEORGE E. SAVAGE, OF MERIDEN, CONNECTICUT, ASSIGNOR TO MANNING, BOWMAN & COMPANY, OF MERIDEN, CONNECTICUT, A CORPORATION OF CONNECTICUT.

APPARATUS FOR MAKING TEA AND OTHER INFUSIONS.

1,077,491. Specification of Letters Patent. Patented Nov. 4, 1913.

Application filed June 28, 1912. Serial No. 706,357.

*To all whom it may concern:*

Be it known that I, GEORGE E. SAVAGE, a citizen of the United States, residing at Meriden, New Haven county, State of Connecticut, have invented certain new and useful Improvements in Apparatus for Making Tea and other Infusions, of which the following is a full, clear, and exact description.

The present invention relates to infusion apparatus, and particularly to a device to be used for preparing the infusions of tea and analogous beverages. The structure of the device is particularly designed with a view to affording not only expedition of operation, but to afford means of controlling the strength of the infusion. In addition, the parts forming this structure are comparatively simple and inexpensive and afford an effective means to attain the end desired.

A preferable embodiment of my invention is illustrated in the accompanying drawings, in which, Figure 1 is a view of my infusion apparatus as incorporated and mounted in a tea pot body. Fig. 2 is a vertical sectional view, partly in elevation, of the infusion apparatus, and Fig. 3 is a top plan view of the parts shown in Fig. 2.

Referring to the drawings by numerals, 1 indicates a pot body of the conventional shape, forming a reservoir for the infusion, and provided with the usual handle 2 and spout 3. Adjacent its upper edge, the body is formed with an internal annular shoulder 4 forming a seat for the infusion apparatus. This apparatus comprises a body portion or cup 5 provided with an imperforate bottom and with an annular flange 6 adjacent its upper edge, forming an annular shoulder designed to rest upon the seat 4 and support the apparatus within the pot body. The body portion of the cup 5 is formed with an upper beaded edge 7 designed to fit against the sides of the pot body and serving to center the cup within the pot body and relative to its seat. This body portion of the cup 5 below its annular flange or seat 6 is provided with a series of outlet openings 8 extending circumferentially of the cup body below its flange 6.

Seated centrally in the bottom of the body portion of the cup 5 and extending upwardly therefrom is a filtration tube 9 having an open upper end and having its lower end closed and substantially coincident with the bottom of the cup body and provided with one or more restricted outlet apertures 10. This tube, above the base of the cup body 5, is provided with a series of filtration openings 11 therein extending circumferentially of the tube adjacent its lower end and above the bottom of the cup body. These openings are preferably of such small size as to act as filters to permit the inflow of liquid infusion without being clogged by material within the cup body.

It should be stated that the body portion of the cup 5 is designed to act as a container for tea or other material which is deposited in the bottom of the cup 5. Within the cup body 5 is detachably mounted a combined retainer plate and funnel 12 having its funnel aperture 13 of greater diameter than the tube 9 and having its upper and outwardly flaring end 14 resting upon the interior of the annular flange 6 of the cup body 5 and supporting the retainer and funnel therefrom. In order to provide for the convenient manipulation of this retainer and funnel, a suitable bail or handle 15 is preferably provided and is secured to and extends transversely of the exterior of the combined retainer and funnel. The upper edge of the cup body 5 on its interior is provided with lugs 16 extending inwardly and located at diametrically opposite points. The outer edge of the retainer and funnel 12 is provided with recesses 17 at diametrically opposite points, shaped to permit the upper edge of the retainer and funnel to clear the lugs 16 and be seated on the annular flange 6, these lugs and recesses having the function of a bayonet joint, and the retainer and funnel being turned, after being seated, to prevent accidental displacement. I also prefer to provide a cover top 18 for the body portion of the cup 5, which cover top is provided with recesses 19 cut in its lower edges at diametrically opposite points, and shaped to permit the lower edge of the cover top to clear the lugs 16 and seat over the upper edge of the combined retainer and funnel 12 with its body extending partially above the top of the pot body 1. This cover top 18 is locked against accidental displacement by turning in the same manner as described in connection with the combined retainer and funnel.

From Fig. 1 of the drawing it will be seen that the outlet openings 8 are below the annular shoulder or seat 4 of the pot body and that liquid may, therefore, escape through these outlet openings into the interior of the pot body. Liquid may also escape through the openings 11 in the sides of the filtration tube and through the restricted outlet aperture or apertures in the closed bottom of said tube, this restricted aperture and the outlet openings 8 both being in communication with the interior of the pot body or reservoir.

To prepare an infusion of tea, for example, with the apparatus above described the cup 5 is seated on the reservoir body, such as the pot body 1, with its cover top and retainer removed. The requisite quantity of tea is placed in the bottom of the cup, and the retainer seated thereover in the manner described. When this has been done, the necessary amount of boiling water is then poured into the cup and through the funnel of the retainer 12, this water being directed to the bottom of the cup body and saturating the tea leaves contained therein. If the water is poured in rapidly, it will rise through the tea, extracting the essence thereof as it rises and, if the water is poured in fast enough, will rise upwardly and escape through the outlet openings 8 into the interior of the pot body. The liquid thus escaping will have extracted considerable essence of tea. The remainder of the liquid during the meantime has been saturating the tea leaves and gradually escaping through the openings 11 in the filtration tube 9 and through the restricted aperture or apertures 10 in the closed bottom of said tube, falling thence into the bottom of the pot or reservoir body. By regulating the rate at which water is poured into the apparatus, the strength of the tea infusion may be varied at the will of the user.

It should be noted in connection with the foregoing that the retainer 12, being imperforate, prevents any overflow of the infusion from the top of the cup body and directs it to the series of outlet openings 8. The height of the filtration tube 9 is also such that it acts as a guide and centering device for the combined retainer and funnel and is imperforate except adjacent its lower end, and preferably extends above the height at which the liquid containing the infusion of tea can rise.

While I have illustrated and described the infusion apparatus in connection with a specific form of pot or reservoir body, it can, of course, be used in connection with various forms of such bodies and is not designed to be limited for coöperation with any single specific form. Also, while the apparatus is described as being especially adapted for preparing tea infusions, it is, of course, susceptible of use in preparing infusions of other materials with which a similar process may be employed.

What I claim, therefore, and desire to secure by Letters Patent is:

1. In a device of the character described, a pot body provided with a seat, a container adapted to rest upon and be supported by said seat within said pot body and having an imperforate bottom, a filtration tube extending upwardly from said container bottom having a closed lower end provided with a restricted aperture therein in communication with the interior of said pot body, said tube having an aperture formed therein above the bottom of said container and in communication with the interior thereof, and said container having overflow apertures therein adjacent its upper end.

2. In a device of the character described, a pot body provided with a seat, a container adapted to rest upon and be supported by said seat within said pot body and having an imperforate bottom, a filtration tube extending upwardly from said container bottom having a closed lower end provided with a restricted aperture therein in communication with the interior of said pot body, said tube having an aperture formed therein above the bottom of said container and in communication with the interior thereof, said container having overflow apertures therein adjacent its upper end, and an imperforate retainer seated within said container above the overflow apertures therein and provided with a liquid inlet opening.

3. In a device of the character described, a pot body having a seat, a container adapted to rest upon and be supported by said seat and having an imperforate bottom, a filtration tube extending upwardly from said bottom having a closed lower end provided with a restricted aperture therein in communication with the interior of said pot body, said tube having an aperture formed therein above the base of said container and in communication with the interior thereof, and a combined funnel and retainer adapted to be detachably seated within said container over the material therein with its funnel aperture of greater diameter than and extending about said filtration tube and serving to direct liquid to the interior of said container below said retainer.

4. In a device of the character described, a pot body having a seat, a container constructed and arranged to rest upon and be supported by said seat and having an imperforate bottom and an internal seat intermediate of its top and bottom, a filtration tube extending upwardly from said bottom having a closed lower end provided with a restricted aperture therein in communication with the interior of said pot body, said tube having apertures formed therein above the base of said container and in communication with the interior thereof, an imperforate retainer having a liquid inlet opening therein adapted to be detachably seated within said container over the material therein and resting upon and supported by said internal seat, and a plurality of apertures formed in the sides of said container below said annular seat and said retainer and in communication with the interior of the pot body.

5. In a device of the character described, a pot body having a seat, a container constructed and arranged to rest upon and be supported by said seat and having an imperforate bottom and an internal seat intermediate of its top and bottom, a filtration tube extending upwardly from said bottom having a closed lower end provided with a restricted aperture therein in communication with the interior of said pot body, said tube having apertures formed therein above the base of said container and in communication with the interior thereof, a combined funnel and retainer detachably seated within said container with its outer edge resting upon said internal seat and with its funnel aperture of greater diameter than and extending about said filtration tube and serving to direct liquid to the interior of said body portion below said retainer, and a plurality of apertures formed in the sides of said container below said annular seat and said retainer and in communication with the interior of the pot body.

6. In a device of the character described, a pot body having a seat, a container adapted to rest upon and be supported by said seat and having an imperforate bottom, an imperforate retainer supported by and within said container, said container having a plurality of outlet openings formed therein below said retainer and in communication with the interior of said pot body, and said retainer being provided with a liquid inlet opening communicating with the interior of said container.

7. As an article of manufacture, an infusion apparatus comprising a container having an imperforate bottom, an imperforate retainer supported by and within said container and having a liquid opening therein, and a plurality of outlet openings formed in the sides of said body portion below said retainer.

8. As an article of manufacture, an infusion apparatus comprising a container having an imperforate bottom, a filtration tube extending upwardly from said bottom having a closed lower end provided with a restricted aperture therein and having a plurality of apertures formed in its sides above the bottom of said container and in communication with the interior thereof, an imperforate retainer detachably seated within said container, and a plurality of outlet openings formed in the sides of said container below said retainer.

GEORGE E. SAVAGE.

Witnesses:
A. L. STETSON,
A. L. HUBBARD.

---

Copies of this patent may be obtained for five cents each, by addressing the "Commissioner of Patents, Washington, D. C."

Correction in Letters Patent No. 1,077,491.

It is hereby certified that in Letters Patent No. 1,077,491, granted November 4, 1913, upon the application of George E. Savage, of Meriden, Connecticut, for an improvement in "Apparatus for Making Tea and Other Infusions," an error appears in the printed specification requiring correction as follows: Page 3, line 55, after the word "liquid" insert the word *inlet;* and that the said Letters Patent should be read with this correction therein that the same may conform to the record of the case in the Patent Office.

Signed and sealed this 18th day of November, A. D., 1913.

[SEAL.]

R. T. FRAZIER,
*Acting Commissioner of Patents.*